US007169335B2

(12) United States Patent
Pietsch

(10) Patent No.: US 7,169,335 B2
(45) Date of Patent: Jan. 30, 2007

(54) PROCESS FOR ENCAPSULATING DISSOLVED REACTANTS OF COLOR-REACTION SYSTEMS, THE CAPSULES OBTAINABLE THEREFROM AS WELL AS THEIR USE IN COLOR-REACTION PAPERS

(75) Inventor: Günter Pietsch, Isernhagen (DE)

(73) Assignee: Papierfabrik August Koehler AG, Oberkirch (DE)

( * ) Notice: Subject to any disclaimer, the term of this patent is extended or adjusted under 35 U.S.C. 154(b) by 237 days.

(21) Appl. No.: 10/665,381

(22) Filed: Sep. 18, 2003

(65) Prior Publication Data

US 2005/0191488 A1    Sep. 1, 2005

(30) Foreign Application Priority Data

Sep. 20, 2002  (DE) ............................... 102 43 921

(51) Int. Cl.
*B01J 13/02* (2006.01)
*B01J 13/06* (2006.01)

(52) U.S. Cl. .................. 264/4.1; 427/213.3; 428/402.2

(58) Field of Classification Search ................ 503/201; 427/150, 213.3–213.36; 428/402.2–402.21; 264/4.1–4.7
See application file for complete search history.

(56) References Cited

U.S. PATENT DOCUMENTS 4,021,364 A    5/1977   Speiser et al.
4,748,146 A *  5/1988   Pietsch et al. .............. 502/201
4,859,650 A    8/1989   Hilterhaus

FOREIGN PATENT DOCUMENTS

| DE | 34 42 268 C1 | 9/1985 |
| DE | 44 07 813 C1 | 10/1995 |
| EP | 0520639 A1 * | 12/1992 |
| EP | 0 718 116 A2 | 6/1996 |
| EP | 0 674 942 B1 | 1/1999 |
| GB | 1 420 175 | 1/1976 |

* cited by examiner

*Primary Examiner*—James J. Seidleok
*Assistant Examiner*—Saira B. Raza
(74) *Attorney, Agent, or Firm*—Darby & Darby

(57) ABSTRACT

A process is described for encapsulating a solution of color reactants of color-reaction systems present in an aqueous emulsion accomplished by means of conventional microencapsulation processes, in which the color reactant is first dissolved in a solvent and a non-dissolver, which may insignificantly dissolve the color reactant, is mixed into the resulting solution in an amount that establishes a supersaturated solution while mixing at high speed, the supersaturated solution is emulsified immediately in the aqueous phase while mixing at high speed, and immediately thereupon the encapsulation is performed. A vegetable oil $C_1$–$C_8$ alkyl ester is used as the solvent. This process has economic and technological advantages. For example, it can be used to produce microcapsules that have an advantageous narrow monomodal particle distribution, which results in improved writing performance.

2 Claims, 1 Drawing Sheet

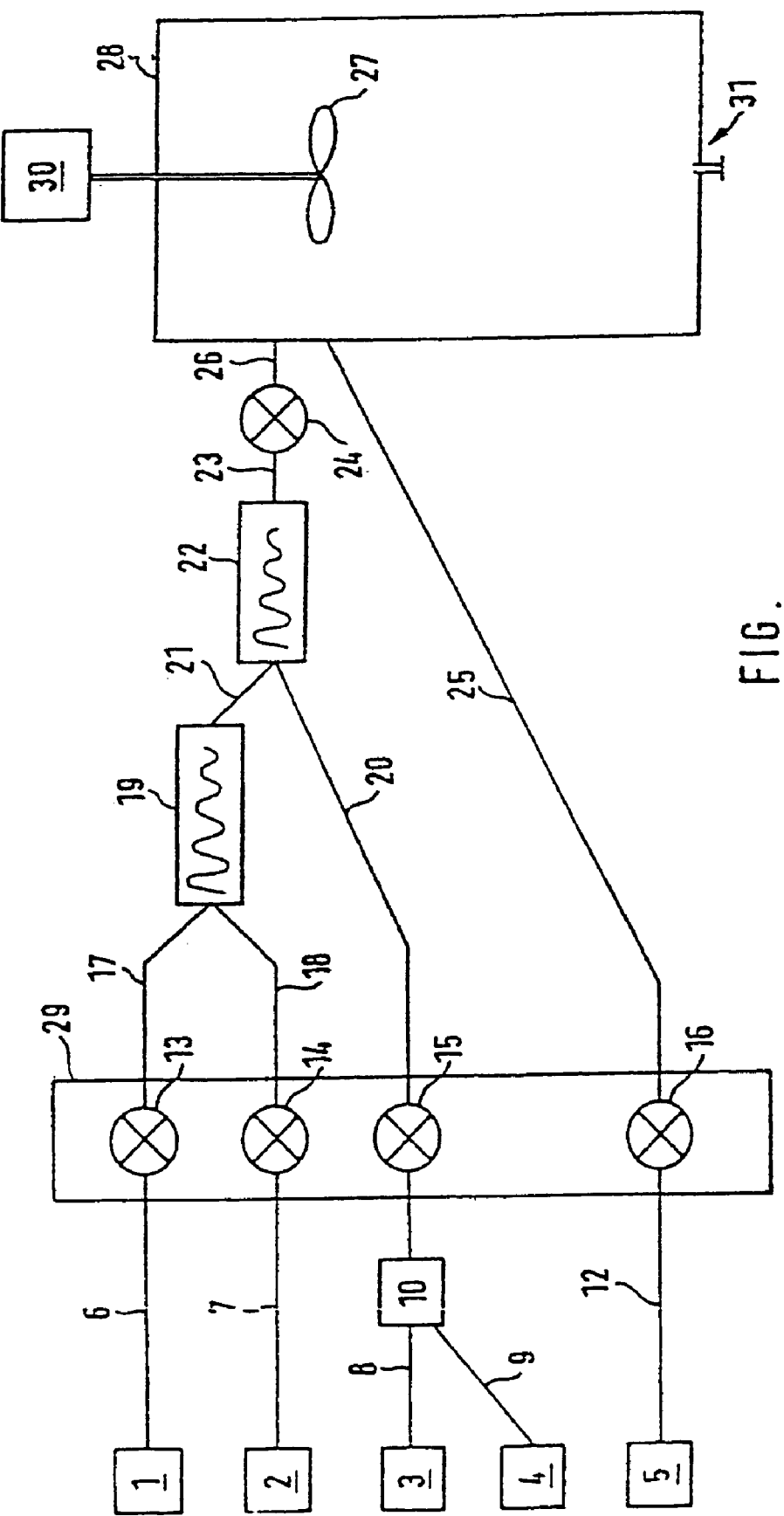

PROCESS FOR ENCAPSULATING DISSOLVED REACTANTS OF COLOR-REACTION SYSTEMS, THE CAPSULES OBTAINABLE THEREFROM AS WELL AS THEIR USE IN COLOR-REACTION PAPERS

The invention relates to a process for encapsulating a solution of color reactants of color reaction systems present in an aqueous emulsion through conventional microencapsulation processes, whereby the color reactants are first dissolved in a solvent and a non-dissolver, which does not significantly dissolve the color reactants, is added to the resulting solution while mixing at high speed in an amount that produces a supersaturated solution, the supersaturated solution is directly emulsified, while mixing at high speed, in the aqueous phase, and directly thereupon the encapsulation is performed.

A process of the type described above is disclosed in DE 34 42 268 C2. The object of this process is that supersaturated solutions of color reactants of color-reaction systems that have particularly high contents of inexpensive non-dissolvers can be encapsulated without having an adverse effect on the writing quality of the color-reaction system in a subsequent writing process. This process allows a highly supersaturated solution of the color reactants to be encapsulated, provided that such a solution is subjected to an emulsification and encapsulation process immediately after it has been prepared and before a premature, adverse crystallization of the dissolved color reactant has occurred. If capsules obtained in this manner are used in color-reaction systems, the color reactions that occur in the printing process proceed in an unexpectedly unimpaired manner, as if a pure non-saturated system were enclosed in the capsules, and not a supersaturated system. The solvents and, respectively, non-dissolvers used in this process are not biodegradable. It would therefore be desirable to use biodegradable solvents, at least a percentage thereof, without having an adverse effect on the desired advantageous effects.

In the prior art, processes in which, for example, vegetable oil alkyl esters are used, are already described. Here, supersaturation is not involved. For example, EP 0 593 192 B1 discloses a pressure-sensitive recording material, and the chromogenic material is dissolved in an ester. This ester is a mono-, di-, or trifunctional ester of a nonaromatic mono-carboxylic acid that contains a saturated on unsaturated linear or branched hydrocarbon chain having at least 5 carbon atoms in the chain, in addition to the carboxyl carbon atom. Here, the restriction applies that (a) the ester is not present in a mixture with vegetable oil, (b) in the case of a diester, said diester is not present in a mixture with hydrocarbon oil, and (c) if the ester is a methyl palmitate, the chromogenic composition is essentially comprised wholly of ester(s) as disclosed, and chromogenic material.

EP 0 520 639 B1 describes a pressure-sensitive copying paper, whereby the solvent that is used for the color-producing material is a vegetable oil. In addition, it contains a mono- or difunctional ester of a nonaromatic monocarboxylic acid that has saturated or unsaturated, linear or branched hydrocarbon atoms having at least 3 carbon atoms in the chain.

DE 695 04 612 T2 relates, among other things, to microcapsules for pressure-sensitive recording papers. In it, the hydrophobic chromogenic substance is dissolved in an organic solvent. This solvent may contain a mixture that has been obtained through the transesterification of a vegetable oil. It is found that the chemical transformation of the vegetable oils, even though it does not eliminate the impurities from the starting oils and does not modify the composition of fatty acids in the same oils, permits the performance of synthetic esters to be achieved. As a result, the cost to manufacture this product ought to be reduced to a level far below that of synthetic esters. This prior-art teaching also takes into account that, in addition to the still unpurified transesterification products of a vegetable oil, mineral oils are used, but in an amount that still completely dissolves the color-producing material.

The object of the invention is to advance the prior art described above so that it can be performed economically in the future and so that microcapsules can be obtained which, when they are used in pressure-sensitive recording systems, meet the required specifications and offer environmental advantages as a result of incorporating biodegradable plant oils or derivatives thereof.

In an invention, this object is achieved by using a vegetable oil $C_1$–$C_8$ alkyl ester as the solvent.

The $C_1$–$C_8$ alkyl ester is an ester having a so-called low-molecular-weight alkyl group having 1 to 8 carbon atoms. In particular, it is a low-molecular-weight linear or branched alkyl substituent having a carbon number of 1 to 8. Preferably, the alkyl substituent is $C_1$–$C_5$ group, more preferably a $C_1$–$C_4$ group. The alkyl substituents are attributable, in particular, to an esterification or transesterification of the given vegetable oil with methanol, ethanol, n-propanol, isopropanol, n-butanol, isobutanol, t-butanol, pentanol, and hexanol isomers and/or 2-ethyl hexanol. Vegetable oil methyl esters are particularly preferred in the invention, more preferred are rapeseed methyl esters, the latter, in particular, in purified form.

With regard to a vegetable oil transesterified to form a $C_1$–$C_8$ alkyl ester, the invention is not subject to any significant restriction. For example, the oils may be dwarf palm oil, rapeseed oil, soybean oil, linseed oil, corn oil, palm oil, safflower oil, olive oil, peanut oil, cottonseed oil, coconut oil, palm kernel oil, rapeseed oil, castor oil, and wood oil.

Preferably, a rapeseed oil $C_1$–$C_8$ alkyl ester is used in the invention. In the case of rapeseed, two specific types of rapeseed oil are available in the current market situation. The distinguishing characteristic is the eruca acid content. Thus, there are rapeseed oils that have a high eruca acid content ("high eruca acid rapeseed, HEAR") with a specific fatty acid pattern, whereby a primary component is eruca acid, while additional main components are present in the form of fatty acids of C18:1, C18:2, and C18:3, while the fatty acid pattern of rapeseed oil that has a low eruca acid content results in a clear shift in the fatty acid pattern in this regard, whereby the eruca acid content is only a few percent, and the fatty acids referred to above C18:1 in addition to C18:2 and C18:3 make up the primary component. In this regard, we draw the reader's attention to Michael Bockisch "Nahrungsfette und -öle" [Edible Fats and Oils], *Handbuch der Lebensmittel-Technologie*, Verlag Eugen Ulmer, 1993, pp. 210–211. The breeding of the two rapeseed types referred to above has recently resulted in so-called double-zero or "zero-zero types", that only contain eruca acid and toxic glucosinolates in trace amounts, while they are rich in oleic acid. As a general principle, both rapeseed oils can be used as starting materials for the alkyl esters that are to be used in the invention, and in individual cases the rapeseed oil that has a higher eruca oil content offers advantages, for example improved writing performance. In individual cases, it has been found that the desired effects can be achieved if a rapeseed oil having a high eruca acid content is transesterified to form the vegetable oil $C_1$–$C_8$ alkyl ester, and is then used in accordance with the invention. Here, the desired effects are achieved in particular when the resulting product of the process has been purified to remove impurities, which also applies to all additional vegetable oil $C_1$–$C_8$ alkyl esters that would comply with the scope of the invention. If one is dealing with a single vegetable oil $C_1$–$C_8$ alkyl ester, then a specific chemical species should be expressly named, regardless of whether it is actually prepared or obtained. As a general rule, it is possible to obtain a vegetable oil $C_1$–$C_8$ alkyl ester of the invention through the transesterification of a vegetable oil, as well as by combining suitable fatty acids and esterifying them with the suitable alcohols.

As part of the invention, the cited color reactant of color-reaction systems is converted into a solution containing one of the indicated vegetable oil $C_1$–$C_8$ alkyl esters. This can be the only solvent. However, in various cases it has been found to be particularly advantageous if the solution also contains an additional solvent that is able to better dissolve the color reactants that are referred to than would be the case with the vegetable oil $C_1$–$C_8$ alkyl ester, and that is referred to as a "solvent of good dissolving power." When we speak here of a "solvent of good dissolving power," then this dissolving power refers to the ability to dissolve the various color reactants. If the color reactant is dissolved by such a solvent in an amount that results in a sufficiently concentrated and encapsulating solution, then we shall speak, in the absence of the vegetable oil $C_1$–$C_8$ alkyl ester that must be used in accordance with the invention, of a "good dissolving power." The determination of "good dissolving power" is all that is necessary here, since in the context of the invention this solvent is used alone, not in combination with the described vegetable oil $C_1$–$C_8$ alkyl ester.

Accordingly, if a "solvent having good dissolving power" is used in addition to the vegetable oil $C_1$–$C_8$ alkyl ester, whose use is mandatory in the invention, the guideline that should apply here is that its dissolving ability should be at least 10% greater than that of the given vegetable oil $C_1$–$C_8$ alkyl ester with the color-producing substances remaining the same, preferably 20% greater and more preferably more than 30% greater (under otherwise identical conditions).

Of course, each solvent must have an inert character in the supersaturation system that is to be prepared—in other words, it must not itself change chemically, nor may it change the given dissolved chemical compound, a requirement that also applies to the vegetable oil $C_1$–$C_8$ alkyl ester that is to be used in accordance with the invention. Thus, any changes that might appear must be negligible.

The "non-dissolver" used for the purposes of the invention is also inert in the sense described above, but it would not alone form a sufficiently concentrated solution of the color reactants to be dissolved. Rather, it would only insignificantly dissolve such reactants, for example approximately 0.01 to 3%, preferably 0.1 to 0.3% or less, which is virtually insignificant with respect to the concentration of color reactants in the solution to be incapsulated. For example, in the case of the majority of known color-producing substances, as well as their acid color reactants, which routinely dissolve particularly well in aromatic systems, this would mean, for example, that non-polar aliphatic compounds would fall into the category "non-dissolvers," that would not dissolve these color reactants in practical terms. As a consequence, therefore, the terms "non-dissolver" as well as "solvent" in the form of vegetable oil $C_1$–$C_8$ alkyl esters and "solvents having good dissolving capability" must always be considered with respect to their ability to dissolve the compounds in the form of the stated color reactants that are to be dissolved. In each case, their dissolving capability differs so clearly in this regard that the definitions used here are justified from this perspective.

The solvents that are referred to as good solvents are, in particular, aromatic solvents and/or chlorinated paraffins. Specifically they include alkylated biphenyls, partially hydrogenated terphenyls, and arylated xylenes, such as xylylxylene, alkylated naphthalenes, in which the alkyl substituent preferably contains 3 to 10 carbon atoms and is, in particular, the isopropyl, diisopropyl, butyl, amyl, hexyl, and/or 2-ethylhexyl substituent. The alkyl phthalates, in particular the octyl phthalates, but also simple aromatic compounds such as benzene, alkyl benzenes (for example methylbenzene, ethylbenzene, propylbenzene, isopropylbenzene, amylbenzene, and hexylbenzene) as well as halogen benzenes, such as chlorobenzenes, are suitable. Among the nonaromatic compounds that also represent solvents having good dissolving capability in the context of the invention are, in particular, chlorinated paraffins. Especially significant among them are chlorinated linear paraffins having 6 to 18 carbon atoms and a degree of chlorination of from 20 to 60 wt. %.

In the context of the invention, a multitude of non-dissolvers can be used for the various color reactants of color reaction systems. In particular, these are nonaromatic solvents whose precursors are either found in large quantities in nature and are therefore inexpensive, or are easily and therefore economically produced. They include, in particular, aliphatic and cycloaliphatic compounds. The aliphatic and cycloaliphatic petroleum components play a particular role, in particular unrefined gasoline (gasoline) as well as its subfraction in form of petroleum ether, low-boiling-point petroleum spirits, ligroin (mineral spirits), heavy petroleum spirits, light oil (cerosin), i.e. the second main fraction of a petroleum subjected to fractional distillation, that contains paraffin hydrocarbon having from 9 to approximately 20 carbon atoms, as well as also gas oil (diesel oil, heating oil) as the third main fraction of distillation, which is composed of paraffins having from 12 to 18 carbon atoms, and which is used in diesel engines or for heating purposes. Natural gas gasoline, which represents the gaseous gasoline components present in natural gas and is removed from the gas by means of compression or absorption in oil, is also suitable.

The aliphatic petroleum fractions referred to above are based on a petroleum that mainly contains linear paraffins. In addition, there is also petroleum (such as soviet naphtha) that consists of up to 80% cyclic hydrocarbons (naphthenes). The liquid naphthene fractions can also be used advantageously. The most important representatives of such naphthenes are cyclopentane and cyclohexane, as well as their alkyl derivatives. In addition, petroleum fractions of petroleums which, with regard to their composition, assume an intermediate position between "paraffinic" and "naphthionic" petroleums.

The invention is not subject to any significant restrictions in selecting the quantitative ratios between non-dissolvers and solvents. A person skilled in the art can easily adjust the weight ratio that will ensure that the process of the invention will take place and ultimately a valuable encapsulation material that permits the object stated above to be achieved will be obtained. Preferably, the solvent and solvent mixture and the non-dissolver, in particular in the form of the nonaromatic solvent, will be adjusted to a weight ratio in which approximately 0.5 to 4 wt. parts, preferably 1 to 2.5 wt. parts, non-dissolver will be used to 1 wt. part solvent or solvent mixture. In the event that a "good" solvent is used for the respective color reactant of a color reaction system in addition to the vegetable oil $C_1$–$C_8$ alkyl ester that is to be used in accordance with the invention, it is preferred that approximately 0.1 to 9 wt. parts vegetable oil $C_1$–$C_8$ alkyl ester be used to 1 wt. part good solvent, more preferably about 0.25 to 2 wt. parts. In any event, as already stated a number of times, ultimately the desired supersaturation system is adjusted and processed further in accordance with the invention. Relative to room temperature, the supersaturation should be adjusted to at least 5%, preferably at least 30%, and more preferably more than 50 wt. %. It is within the scope of the invention that with process control under the manual direction of skilled operators it is quite possible to achieve a supersaturation degree of more than 60 wt. %, and in individual cases more than 85 wt. %.

The process of the invention is particularly advantageous for the encapsulation of color-producing substances of color reaction systems, in particular in color-reaction papers, in which color-producing substances and acid color reactants are spatially separated from each other on the surface of two different contacting papers or on the surface of a single paper (autogenous papers). In particular, basic color-producing substances are used as the color reactants in color reaction systems. In particular, the following compounds may be used: diary phthalide, such as 3,3-bis-(p-dimethylaminophenyl)-6-dimethylamino phthalide (crystal violet lactone) and 3,3-bis-(p-dimethylaminophenyl) phthalide (malachite green lactone), leucauramines, such as N-(2,5-dichlorophenyl)leucauramine, N-benzoylauramine, N-acetylauramine, or N-phenylauramine, rhodamine B-lactam, such as N-(p-nitrophenyl)rhodamine-B-lactam, polyaryl carbinols, such as bis-(p-dimethylaminophenyl)methanol, crystal violet carbinol. A preferred economic importance is enjoyed by the color-producing group of the fluoroanes, in particular the 2,7-di-N-substituted fluoranes, whose amino or N-heterocyclic groups are substituted (for the sake of completeness, it must be noted here that in the literature on the subject, the 3.7 positions of the fluorane structure are occasionally referred to as 2.6 positions, depending on the nomenclature counting system used). Such fluorane color-producing substances are described extensively in the literature, for example in EP-A-276 980, GB-B-12 69 601, GB-B-13 74 049, GB-B-20 02 801, GB-B-11 82 743. Additional significant color-producing substances are found in the group of 3.1 benzoxazines, for example 2-phenyl-4-(4-diethylaminophenyl)-4-(4-methoxyphenyl)-6-methyl-7-dimethylamino-4-H-benzo-3.1-oxazine or isomeric compounds thereof. Benzo- and naphthospiropyranes are of some significance. These are so-called primary color-producing substances which are capable of producing a color in the desired color reaction almost instantaneously as a result of the reaction with the acid color reactant. In addition, secondary color-producing substances whose color reaction takes place comparatively slowly and which counteract a rapid bleaching-out of the color formed by the primary color-producing substance can be used. N-benzoylleucomethylene blue and/or an N-alkylcarbazolyl-diphenylmethane derivative are particularly suitable for this purpose.

In color-reaction technology, in particular in color-reaction paper technology, it is advantageous in individual cases to also encapsulate the color reactant of the color-producing substance in dissolved form. In particular, an aromatic solvent is used for the usual acidic color reactants. The color reactants include acidic phenolic resins, in particular phenylaldehyde resins, such as phenylformaldehyde resins. So-called "chelated" or "zinc-modified" phenolic resins in which the phenolic protons are replaced by zinc can be encapsulated within the scope of the invention. These phenolic resins are described, for example, in U.S. Pat. No. 3,732,120. In particular, compounds having an acidic carboxyl group (also in the form of an anhydride structure), such as: phenol acetylene polymers, maleic acid resins, partially or completely hydrolyzed styrene maleic acid anhydride copolymers, and ethylene maleic acid anhydride copolymers, carboxypolymethylene, and partially or completely hydrolyzed phenylmethylene ether maleic acid anhydride copolymer, p-halogenphenol formaldehyde resins, as well as resins of the bisphenol A type, may be used. In addition, acid monomers of phenolic compounds are especially suitable, for example bis-(p-hydroxyphenyl) propane, naphthol derivatives, p-hydroxybenzoic acid esters, and salicylic acid derivatives.

The acetic color reactants of color-producing substances described above are particularly well suited in the context of the invention for the following color-producing substances: crystal violet lactone, orange, red, and olive green or black-reacting fluoranes, and benzonaphthospirane compounds.

The present invention is not subject to any significant restrictions in the selection of the encapsulation process. The prior-art encapsulation processes may be used. These processes generally achieve sufficiently fast encapsulation of the freshly formed saturated solution system of the color-producing substance or of its acetic color reactant in emulsion form. Generally, the formation of a capsule wall is completed within a few seconds to a few minutes, although the wall may still be liquid. The encapsulation can be completed in a time frame of only about two minutes. Subsequent measures, for example the hardening of the capsule, are not of equally critical significance to the invention, and they can take significantly longer reaction times. In the context of the invention, the gelatin-based coacervation process as well as the melamine-formaldehyde condensation process are especially preferred. Conventional processes that are not based on the coacervation or the condensation principles are equally suitable.

Suitable encapsulation processes are explained below in greater detail. In the coacervation process, a 50° C. hot aqueous solution, for example, of an ionizable hydrophilic colloid material (in particular gelatin, gum arabic, CMC, alginate, or casein) is prepared, and at least two charged colloids with electrically opposite poles are selected. When gelatin and, for example, gum arabic are used, electronegatively charged colloid ions of the same name are present above the isoelectric point of the gelatins (for example pH 8). The solution of the color-producing substance that is to be encapsulated is emulsified in this aqueous colloid solution, forming an emulsion of the oil-in-water type. The pH is reduced to about 3.8 while simultaneously diluting the emulsion with water by adding 50° C. warm, highly diluted aqueous acetic or hydrochloric acid to the emulsion. The gelatin molecules then have their charge changed to an electrically positive charge, combined with the precipitation of the liquid complex acervate that forms the capsule wall. Gelation or solidification of the capsule wall occurs when the mixture is cooled from 60° C. to 6 to 8° C. An additional chemical hardening of the capsule walls which is accomplished by means of a cross-linking of the gelatins using formaldehyde or glutardialdehyde produces stable capsule dispersions. This process is described in U.S. Pat. No. 2,800,457 and elsewhere. It can also be used to encapsulate the acidic color reactant of the color-producing substance.

However, as already mentioned above, there are also processes in which the microcapsules are produced with an encapsulated solution of a color color [sic] reactant of a color-reaction system without coacervation and solely by mixing an oleic material that is not miscible with water, into a solution of at least one thermoplastic resin and water. Here, the water causes the resin to precipitate out of the solution in the form of solid particles surrounding a core of the aforesaid oleic material. This process is described in U.S. Pat. No. 3,418,250. Additional relevant encapsulation processes that may be used in the context of the invention are disclosed in DE-A-29 40 786 and 26 52 875.

In the process disclosed in DE-A-29 40 786, the condensation of melamine-formaldehyde precondensates and/or their $C_1$–$C_4$ alkyl esters in water is utilized by dispersing the material that later forms the nucleus of the microcapsules and that is essentially insoluble in water. The condensation takes place in the presence of dissolved polymers that contain negatively charged ionic groups, at pH values from 3 to 6.5, and at temperatures from 20 to 100° C. The unique characteristic of this process is that the polymer that is dissolved in water is a sulfonic acid-group-bearing homopolymer or copolymer that does not have any phenyl and/or sulfophenyl groups and that has a Fikentscher K value of 100 to 170, as well as a viscosity of 200 to 500 mPas with a shear gradient of 489 $s^{-1}$ (measured in a 20 wt. % solution at 20° C.), and the melamine-formaldehyde precondensate is, as required for the condensation, added continuously or in portions. This process is easy to control. Thus, simple test series can be used to easily determine the optimal amount of water-soluble polymers that is required. A similar encapsulation process, which is also based on the condensation reaction of melamine-formaldehyde precondensate resins and/or their $C_1$–$C_4$ alkyl ethers, is described in DE-C1-37 43 427.

The process described in EP-B-0 16 366 can also be used advantageously in the context of the invention. Its specific application involves the preparation of microcapsules containing the solution of a color-producing substance. The solution of the color-producing substance in an organic solvent is enclosed by capsules made of an addition polymerization product of a specific diisocyanate and a diamine. First, while heating and stirring, a suitable diisocyanate is added to a solution of a color-forming substance in an aromatic solvent. This organic phase is then converted into an aqueous polyvinyl alcohol solution and is emulsified in an ultrasonic pipe [sic]. This emulsion is added to a diluted aqueous amine solution while stirring. The amounts of amine and isocyanate are in a stoichiometric ratio. After the addition of the amine, the reaction is continued for a certain time at room temperature and then at a higher temperature.

The process of the invention may be subject to various modifications with regard to certain goals and as a consequence of purely craft-related considerations, without having an adverse impact on the desired advantages. In addition, other processes that are not described above may be suitable for the purpose of the invention, provided that they ensure that the more or less highly supersaturated fresh solution of the color reactants of color-reaction systems, in particular of color-reaction papers, is encapsulated or surrounded in a time that is short enough to ensure that undesirable premature crystallization of the dissolved color reactants is largely prevented prior to encapsulation. A period of about 1 to 60 seconds can be cited as a guideline for the time between the preparation of the supersaturated solution and the formation of the individual droplets of the medium to be encapsulated with the start of encapsulation. With optimum process control, it is even possible to get below this time, which is advantageous. Rapid process control is facilitated when the starting materials and the highest possible concentrated solution of the given color reactant and, on the other hand its non-dissolver, is performed in a high-speed mixer, for example in a stationary tubular mixer that is located directly upstream of the emulsifier per se. The time-determining step in the entire process would only be the encapsulation method. Customary encapsulation processes routinely ensure rapid process control. In technological terms, this invention can be explained as follows: Because of the rapid emulsification and subsequent encapsulation of the fresh supersaturated solution of the color reactant, in particular of the color-producing substance for color-reaction papers, which has high non-dissolver content, the anticipated extensive crystallization process within the capsule does not occur to any identifiable degree. This may be due, for example, to the fact that the forces required to form crystal nuclei within the capsules or on the inner walls of the capsules are not adequate. On the other hand, it is probable that, at least to a certain extent, crystallization processes occur in microscopic form, and that such processes result in particularly fine crystalline or colloidally dispersed precipitation, which virtually corresponds to a molecular dispersion, and that this dispersion state does not have a deleterious effect upon subsequent practical use, for example in capsules containing a solution of a color-producing substance in color-reaction papers in the writing operation. The possible mechanism described above is not intended to be binding. Other mechanisms could provide an explanation.

The particular advantage of the invention is that the percentage of non-dissolver can be exceptionally high, in individual cases up to about 85 wt. % and greater of the entire solution system. This means that the price of the overall solvent system is primarily governed by the inexpensive non-dissolver. If encapsulation is carried out with such a solution system, then we obtain capsules that, with respect to their suitability for use in color-reaction systems, are at least equivalent to the prior-art capsules that are not obtained for supersaturated systems. Because of the mandatory inclusion of vegetable oil $C_1$–$C_8$ alkyl esters required in the invention, additional unexpected advantages come to the fore. In particular, they are pronounced when rapeseed oil $C_1$–$C_8$-alkyl esters are used, preferably rapeseed oil methyl esters. It was found that writing performance improves significantly compared to the previously used system. This may be due, among other things, to the fact that the resulting capsules have an unexpectedly narrow particle size distribution as indicated by their Gaussian distribution curve, and in particular a narrow, monomodal distribution curve. Since, as a consequence of the color intensity of a printout with such carbonless copying systems, it is possible, if the same color intensity is desired, to reduce the microcapsule mass/$m^2$, which results in an economic advantage. It was found that, regardless of the application method (roller application, knife application, or curtain coater) color-producing substance savings of about 20 to 30%, and in individual cases even higher, are possible with the same writing performance.

In addition, the monomodal distribution has further advantages. For example, the undesirable high sensitivity to rubbing, which is found in prior-art systems, is greatly reduced by the elimination of oversized microcapsules. Ineffective microcapsules whose diameter is too small, in the range of about 1 μm, are largely eliminated, which also results in a cost advantage. Microcapsules that are too small are generally of no use, while those that are too large offer too large an exposed surface upon friction and handling. Thus, it is always desirable to have capsules which are largely monomodal with a narrow particle size distribution (for example, an average particle diameter of about 4±1 micrometer, preferably about 4±0.5 micrometer. In addition, biodegradability is improved through the incorporation of plant oil alkyl esters. One particular advantage of this invention is substantial energy savings in the emulsification of the solution that is to be encapsulated. For example, the speed of the emulsifier can generally be reduced from 3700 rpm to about 3100 rpm with no change in the capsule size. This amounts to an energy savings of about 30%. In addition, there is a significant reduction in "transfer of color-producing substance." This phenomenon can be understood as follows: middle sheets that have color-producing substance on the CF side (coated front) tend to transfer color-producing substance after being printed with color inks in the dry or wet offset process. Within a few days, for example after 1 to 2 days, as a result of undesired destruction of capsules, the released color-producing substance in the printed roll moves from the center page CB side to the center page CF side of the next layer. The implementation of the present invention results in a very significant reduction of this phenomenon. This phenomenon of color-producing substance transfer is reduced even further by the already discussed ability to reduce the amount of color-producing substance used.

The invention shall now be explained based on various examples as well as a figure. The figure shows a schematic diagram of the steps in the process of the invention. Reference is made to the encapsulation of a color-producing substance for color-reaction papers. This also applies to the encapsulation of an acid color reactant to the color-producing substance.

Based on the figure, a solution of crystal violet lactone is present in tank 1 in a mixture comprising 30 weight parts xylylxylene and 15 weight parts rapeseed methyl ester, while dearomatized kerosine (aliphatic or non-aromatic solvent) is present in tank 2. An aqueous colloidal gelatin solution is located in tank 4, later it will provide the capsule material. The second colloidal component is located in tank 4, namely as an aqueous gum arabic solution. The colorant-producing solution of tank 1 travels through line 6 into pump head 13 of the dispensing system 29 (metering pumps). In addition to the pump head 13, the dispensing system 29 has additional pump heads 14, 15, and 16. The non-dissolver in the tank is pumped to the pump head through line 7, from the pump heads, 13 or 14, the aforesaid materials travel to tanks 1 and 2 via lines 17 and 18, respectively, into the static tubular mixer. The tubular mixer 19 is a flow tube. The output of pump heads 13 and 14 is controlled in such a way that the mixing ratio of the color-producing solution, containing 30 weight parts xylylxylene and 15 weight parts rapeseed oil methyl ester to kerosine in the freshly combined solvent mixture is 1:1.22.

This mixture is pumped to an additional static tubular mixer 22 through line 21. At the same time, the capsule wall material is pumped via pump head 15 of the dispensing system 29 to the static tubular mixer 22 via line 20. This is a mixture of gelatin and gum arabic solutions from tanks 3 and 4 that travel through lines 8 and 9 and are mixed homogeneously in tank 10. The mixture is then pumped further as already described. The coarse emulsion that is formed in the high-speed mixer 22 is fed into the coacervation tank 28 via line 23 as well as a fine emulsification unit 24 and line 26. At the same time, additives needed for coacervation are fed from tank 5 via line 12 to the pump head 16 of the dispensing system 29 and line 25 into the coacervation tank 28. This is the aqueous acid solution that initiates the coacervation. In the coacervation tank, which is equipped with stirrer 27, a system in which the capsule raw material is still liquid but in which a liquid wall is already present around the droplets that are to be encapsulated is established. The time required to form the liquid capsule wall is only a few seconds, for example 15 seconds. After the mixture leaves the coacervation tank 28 through outlet 31, it is cooled from 50° C. to about 6 to 8° C. During this cooling, the capsule raw material solidifies. In order to give the capsules walls in the capsules that have a diameter of approximately 3 to 10 µm the desired irreversible hardness, the resulting capsule dispersion is hardened in a known manner, for example with the aid of a formalin solution. The equipment that is used for this cooling and hardening is not shown in the described figure. Equipment of this type is known in the prior art.

The following examples illustrate recipes for the saturated solution of color reactants of color-reaction systems that is to be encapsulated in accordance with the invention:

EXAMPLE 1

Recipe for the oil to be encapsulated:

| | |
|---|---|
| Crystal violet lactone | 1.9 wt. % |
| 9-N-butyl carbazolyl-(3)-4',4''-bis (N-methy-N-phenylamino)-diphenylmethane | 0.7 wt. % |
| Monoisopropylbiphenyl | 17.4 wt. % |
| Rapeseed oil methyl ester | 20.0 wt % |
| Dearomatized kerosine | 60.0 wt % |
| | 100.0 wt. % |

EXAMPLE 2

Recipe for the oil to be encapsulated:

| | |
|---|---|
| Crystal violet lactone | 0.94 wt % |
| 6-(N-ethyl-N-p-tolylamino)-2-methylfluorane | 0.45 wt % |
| 1.3-dimethyl-6-diethylaminofluorane | 0.56 wt % |
| 2-dibenzylamino-6-diethylaminofluorane | 0.85 wt % |
| 2-phenylamino-3-methyl-6-diethylaminofluorane | 2.00 wt % |
| Black-reacting color-producing substance mixture | 4.80 wt % |
| Chloroparaffin | 10.00 wt % |
| Rapeseed oil methyl ester | 30.2 wt. % |
| Dearomatized kerosine, naphthene-rich | 55.0 wt. % |
| | 100.0 wt. % |

EXAMPLE 3

Recipe for the oil to be encapsulated:

| | |
|---|---|
| Black-reacting color-producing substance mixture of Example 2: | 4.8 wt. % |
| Diisopropyl naphthalene | 15.0 wt. % |
| Rapeseed oil methyl ester | 20.0 wt. % |
| Aliphatic hydrocarbon oil, purified | 60.2 wt. % |
| | 100.0 wt. % |

EXAMPLE 4

Recipe for the oil to be encapsulated:

| | |
|---|---|
| Crystal violet lactone | 0.68 wt. % |
| 6-diethylamino-2-carboxyethylester fluorane | 0.40 wt. % |
| 6-(N-ethyl-N-p-tolylamino)-2-methylfluorane | 0.32 wt. % |
| 6-dimethylamino-2-dibenzylaminofluorane | 0.60 wt. % |
| 6-diethylamino-2-pheylamino-3-methylfluorane | 1.40 wt. % |
| Black-reacting color-producing substance mixture | 3.40 wt. % |
| Rapeseed oil methyl ester | 40.0 wt. % |
| Dearomatized purified kerosine | 56.60 wt. % |
| Color-producing substance solution to be encapsulated | 100.0 wt. % |

What is claimed is:

1. A process for encapsulating a solution of color reactants of color-reaction systems present in an aqueous emulsion accomplished by microencapsulation processes, comprising:

dissolving the color reactant in a solvent;

mixing a non-dissolver into the resulting solution in an amount that establishes a supersaturated solution;

emulsifying the supersaturated solution immediately in the aqueous phase while mixing at; and encapsulating the supersaturated solution immediately;

wherein a rapeseed oil methyl ester obtained from eruca-acid-rich rapeseed oil is used as the solvent.

2. The process of claim 1, wherein the rapeseed oil methyl ester is used in purified form.

\* \* \* \* \*